Patented Nov. 11, 1930

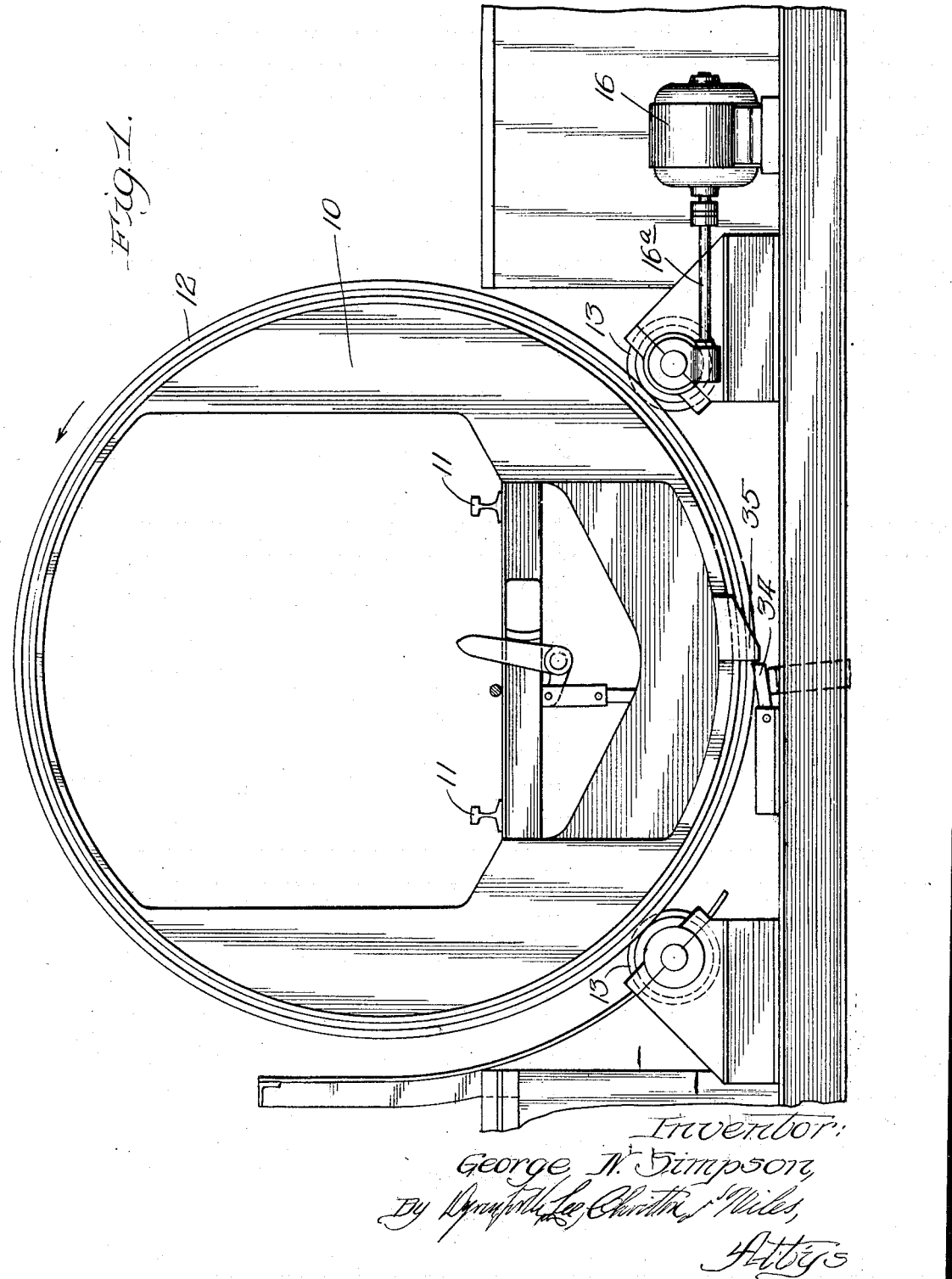

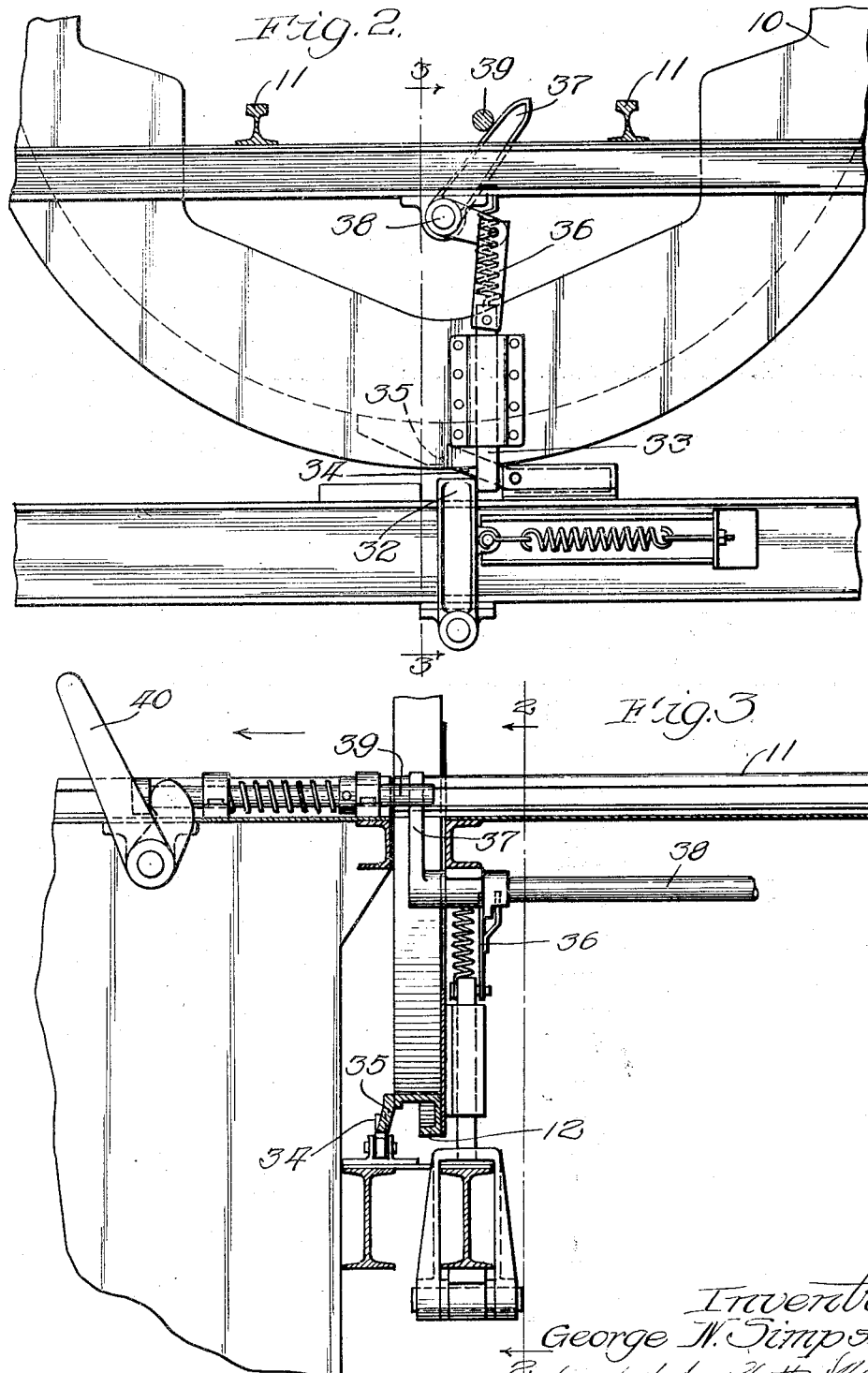

1,781,606

UNITED STATES PATENT OFFICE

GEORGE N. SIMPSON, OF CHICAGO, ILLINOIS

CAR DUMPER

Application filed October 29, 1928. Serial No. 315,654.

This invention relates to improvements in car dumpers, and more especially to car control apparatus in connection with such dumpers.

The invention is here shown as embodied in connection with a car dumper of the rotatable cage type.

By the use of my invention, correct stopping and positioning of the cage, after the dumping operation, is obtained. Means are also provided for automatically throwing out of operation the stopping means to permit movement of the cage for another dumping.

Other features and advantages of my invention will appear more fully as I proceed with my specification.

In that form of device embodying the features of my invention shown in the accompanying drawings, Fig. 1 is a view in end elevation; Fig. 2 is a view taken as indicated by the line 2 of Fig. 3; and Fig. 3 is a view taken as indicated by the line 3 of Fig. 2.

As shown in the drawings, 10 indicates, in general, a cylindrical cage of the type ordinarily used in car dumpers of this character. Since cages of this kind are well known in the art, the details of construction need not be gone into. It will suffice to say that the cage is substantially cylindrical and provided with the rails 11, 11, adapted to contain a car to be dumped. Suitable mechanism (not shown), also well known in the art, may be provided to hold a car on the rails during the dumping operation. The arrow in Fig. 1 shows the direction of rotation of the cage in the dumping operation; and it is to be understood that the cage ordinarily makes one complete rotation to complete the dump.

12 may indicate the ring rail at one end of the dump, it being understood that there is one of these ring rails at each end, and the cage is rotatably supported on the supporting rollers 13, 13, in the usual manner.

The cage may be driven for rotation in any suitable manner. For example, the rotation may be effected by driving one or more of the rollers 13 by means of a motor 16 operating through the driving shaft $16^a$.

At the bottom of the car dumper, is a spring stop 32, adapted to be engaged by a shaft 33, projecting downwardly vertically from the cage 10. This stop is adapted to stop rotation of the cage upon completion of the dumping operation. The shaft 33 is raised and lowered by means of operation of the car control equipment, and when in the lower position, it engages the stop, preventing any possibility of the cage traveling beyond the vertical position when it finishes its rotation.

34 indicates a pivoted dog adapted to be engaged by lug 35 (see Fig. 1) on the cage to prevent a rebound of the cage.

The spiral spring 36 yieldingly pulls the shaft 33 upwardly so that when it is in its upper position, it will not engage the stop 32. As the cage completes its rotation, the lever 37, pivoted at 38, engages the shaft 39 to lower the shaft 33 so that it will engage the stop 32. As an empty car is pushed off of the cage by a loaded car, it engages the trigger 40 to withdraw the end of the shaft 39 to release the arm 37 so that the spring 36 will pull the shaft 33 away from the stop 32, so that the cage may again be rotated for another dumping operation.

The trigger 40 is here shown on the track leaving the cage, where it may be engaged by a part (for example, the axle) of an empty car coming from the cage. It is to be understood, however, that such trigger 40 may be located at any other suitable point where it may be engaged by any car at the proper time, the movement of which is related to, or in conjunction with, the dumping operations of a series of cars.

While I have shown and described certain embodiments of my invention, it is to be understood that it is capable of many modifications. Changes, therefore, in the construction, arrangement and operation may be made without departing from the spirit and scope of the invention disclosed in the appended claims, in which it is my intention to claim all novelty in my invention as broadly as possible, in view of the prior art.

What I claim as new and desire to secure by Letters Patent is:

1. A car dumper of the character described comprising; a rotatably mounted cage adapted to contain a car to be dumped; an approach track leading to the cage; a receiving track leading from the cage; means for rotating the cage; a stop adapted to be engaged by a part on the cage upon completion of the dumping operation; and means operated by movement of a car for disengaging said part from said stop, said means including a trigger adapted to be engaged by a car and a connection between said trigger and said part.

2. A car dumper of the character described comprising; a rotatably mounted cage adapted to contain a car to be dumped; an approach track leading to the cage; a receiving track leading from the cage; means for rotating the cage; a stop adjacent the cage; a part on the cage adapted to be moved to operative position where it will engage the stop, or to inoperative position where it will clear the stop upon rotation of the cage; spring means tending to move said part to inoperative position; and means operated by movement of the cage upon nearing completion of the dumping operation to move said part into operative position, said means including an arm or its equivalent on the cage adapted to engage a part adjacent the cage and a connection between said arm and the spring means whereby engagement of said arm with the part adjacent the cage will release said spring means, permitting the part on the cage to move to operative position where it will engage the stop.

3. A car dumper of the character described comprising; a rotatably mounted cage adapted to contain a car to be dumped; an approach track leading to the cage; a receiving track leading from the cage; means for rotating the cage; a stop adjacent the cage; a part on the cage adapted to be moved to operative position where it will engage the stop, or to inoperative position where it will clear the stop upon rotation of the cage; means for causing said part to be in operative position upon completion of a dumping rotation of the cage, said means including an arm or its equivalent on the cage adapted to engage a part adjacent the cage; and means operated by movement of a car for moving said part to inoperative position, said means including a trigger adapted to be engaged by a car and a connection between said trigger and said part.

4. A car dumper of the character described comprising; a rotatably mounted cage adapted to contain a car to be dumped; an approach track leading to the cage; a receiving track leading from the cage; means for rotating the cage; a stop adjacent the cage; a part on the cage adapted to be moved to operative position where it will engage the stop, or to inoperative position where it will clear the stop upon rotation of the cage; spring means tending to move said part on the cage to inoperative position; and a member adjacent the cage adapted to engage a cooperating member on the cage upon the cage nearing completion of its dumping movement to move the part on the cage into operative position.

5. A car dumper of the character described comprising; a rotatably mounted cage adapted to contain a car to be dumped; an approach track leading to the cage; a receiving track leading from the cage; means for rotating the cage; a stop adjacent the cage; a part on the cage adapted to be moved to operative position where it will engage the stop, or to inoperative position where it will clear the stop upon rotation of the cage; spring means tending to move said part on the cage to inoperative position; a member adjacent the cage adapted to engage a cooperating member on the cage upon the cage nearing completion of its dumping movement to move the part on the cage into operative position; and means operated by movement of a car for disengaging said members whereby the spring means will move the part on the cage to inoperative position.

In witness whereof, I hereunto set my hand this 25th day of October, 1928.

GEORGE N. SIMPSON.